(12) United States Patent
Kyrtsos

(10) Patent No.: US 6,363,331 B1
(45) Date of Patent: Mar. 26, 2002

(54) WEIGHT DISTRIBUTION MONITOR

(75) Inventor: Christos Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/207,796

(22) Filed: Dec. 9, 1998

(51) Int. Cl.⁷ .............................................. G01G 15/00
(52) U.S. Cl. ...................... 702/175; 702/173; 702/174; 701/50; 701/124
(58) Field of Search ................................ 702/175, 173, 702/174, 42, 41, 101; 701/50, 124; 177/1, 25.13, 136

(56) References Cited

U.S. PATENT DOCUMENTS

| 4,605,081 A | * | 8/1986 | Helmly, Jr. et al. ...... 177/25.13 |
| 5,182,712 A | * | 1/1993 | Kyrtsos et al. ............... 701/50 |
| 5,877,455 A | * | 3/1999 | Kyrtsos ......................... 177/1 |

* cited by examiner

Primary Examiner—Marc S. Hoff
Assistant Examiner—Hien Vo
(74) Attorney, Agent, or Firm—Carlson, Gaskey & Olds

(57) ABSTRACT

A method of monitoring the weight distribution on a vehicle includes measuring characteristic values of axles, comparing the measured values with expected values, and when the measured values differ from the expected values, sending warning signals that the vehicle may be experiencing a problem. The method of monitoring the weight distribution on a vehicle is used to determine the weight shift of cargo on the vehicle. The present invention allows the driver to check the weight distribution on the vehicle while operating the vehicle. Characteristic values include any value of the axles that are indicative an effect of weight on the vehicle. Such characteristic values may include acceleration, deceleration, stress, strain, and, of course, weight. Detectors measure the characteristic values on axles of a vehicle and send value signals to a control which receives the value signals, performs computations based on the measured values, and compares the computations with expected values of the axles. The control sends warning signals to a display, when the measured values differ from the expected values.

20 Claims, 3 Drawing Sheets

WEIGHT DISTRIBUTION MONITOR

BACKGROUND OF THE INVENTION

The invention relates to a method of monitoring the characteristic values of axles of a vehicle to determine the weight distribution on the vehicle. The characteristic values of the axles are used to indicate weight shift across the vehicle.

During use, vehicle axles support a large amount of weight. Particularly, truck-trailers that carry large shipments have axles which support heavy weights. Given the amount of weight supported by truck-trailers, a proper weight distribution on a truck-trailer is useful for easier driving and effective handling of the vehicle. However, the distribution of weight on a truck-trailer may change due to the arrangement of the cargo inside the trailer. During movement of the vehicle, the cargo may shift which sometimes causes a significant change in weight distribution on the vehicle. A change in weight distribution sometimes affects the handling of the vehicle and makes operation of the vehicle more difficult.

Presently, to diagnose the status of the weight distribution on a vehicle, the driver of the vehicle is required to routinely check the arrangement of items within the vehicle, e.g., the cargo or shipment in a trailer. A shift or movement of the cargo from its original placement is an indication that the weight distribution across the vehicle has changed and that such shift in weight may cause driving problems. Cargo shift typically occurs during sudden or abrupt driving maneuvers such as when braking, accelerating, or turning. Additionally, cargo shifts may occur when operating the vehicle on slanted or bumpy roads. By checking the arrangement of the cargo, the driver makes a determination as to the weight distribution of the vehicle. In situations where there is an indication of cargo shift, the driver must determine whether the vehicle has experienced a significant weight shift that could potentially affect the handling or operation of the vehicle.

The current method of routinely checking the arrangement of the cargo is time consuming and, sometimes inaccurate. This current method requires the driver to look at the arrangement of the cargo to determine the weight distribution of the vehicle. A considerable amount of time is usually taken to make this determination.

Additionally, in many situations, this current method is inaccurate because it relies on the driver's judgment regarding the weight distribution which depends on the appearance of the cargo and the handling of the vehicle. Moreover, in many circumstances, the driver is not technically trained in determining the distribution of weight of the vehicle.

SUMMARY OF THE INVENTION

In a disclosed embodiment of the invention, a method of monitoring characteristic values of the axles of a vehicle is used to determine the weight distribution on the vehicle. The present invention eliminates the need for the driver to routinely check the cargo arrangement of the vehicle to determine whether a weight shift occurred. The present invention monitors the weight distribution on a vehicle while the driver is operating the vehicle. This provides a more time efficient, accurate, and safe way to monitor the weight distribution on the vehicle.

The present invention includes a method of monitoring the weight distribution on a vehicle, which generally comprises measuring characteristic values of axles of a vehicle, sending value signals of the measured values, receiving the value signals, performing computations of the measured values, comparing the computations with expected values, and sending warning signals when necessary. Detectors may be used to measure the characteristic values of the axles of a vehicle and send value signals to a control which performs the computations and compares the computations with expected values. Finally, the control may send warning signals to a display indicating that a problem may be present.

These and other features of the present invention can be understood from the following specification and drawings.

DETAILED DESCRIPTION OF A PREFERRED EMBODIMENT

Figure 1:
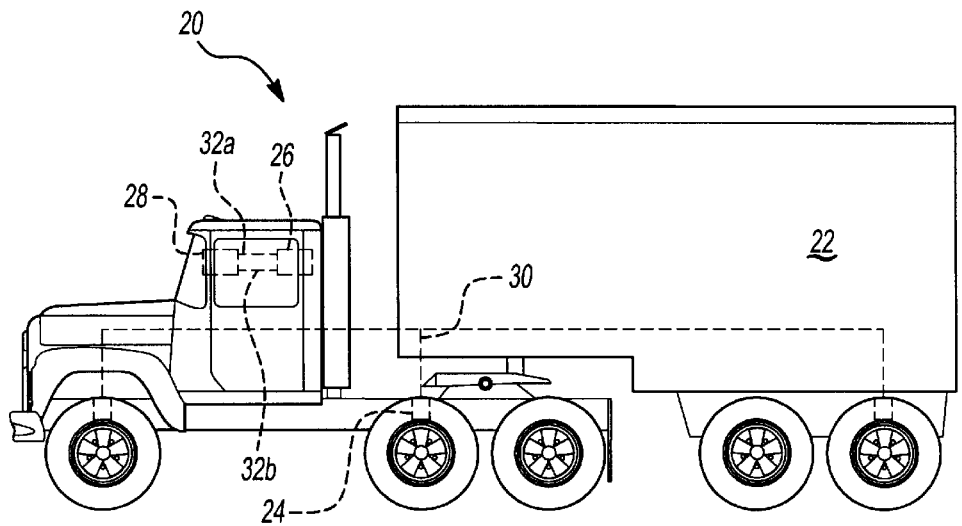
FIG. 1 is a schematic view of one system incorporating the present invention.

FIG. 1 shows a system 20 incorporating the present invention. The method of this invention involves monitoring the characteristic values on axles of a vehicle 22 to determine the weight distribution of the vehicle by using detectors 24, a control 26, and a display 28.

The detectors 24 are shown schematically associated with axles of the vehicle 22. The detectors 24 measure characteristic values of the axles during operation of the vehicle 22 and send value signals 30 representing the measured values to the control 26.

The detectors 24 may be any suitable devices known in the art which can measure characteristic values and send signals that represent the measured values. For instance, the detectors 24 may be vertical accelerometers, which would attach on the axles of the vehicle. Alternatively, load cells, pressure sensors for an air suspension, or other sensors may be used. Characteristic values, as mentioned above, may include axle variables during normal operation of the vehicle such as weight, stress, strain, acceleration, deceleration, or any other suitable axle variable or value that allows an assessment of the effect of weight on each axle. As will be explained below, what this invention looks for is any change in weight distributing. The main goal of this invention is not to provide an absolute weight measurement.

The control 26 receives the value signals 30 from the detectors 24, performs computations based on the measured values, and compares the computations with expected values at each axle. If the measured values are not the expected values of the axles, then warning signals 32A, 32B may be sent from the control 26 to the display 28 indicating that the vehicle 22 may have a problem. In this situation, the vehicle may have experienced a change in weight distribution, due to a shift in the cargo.

The control 26 may be any suitable device known in the art that can receive value signals, perform computations of the measured values, compare the computations with expected values, and send warning signals when necessary. For example, a central processing unit such as a computer that is programmed to perform such tasks may be used. Furthermore, the display 28 may be any suitable device known in the art that can receive warning signals and indicate a problem. For example, a computer monitor, a light emitting device, or a sound emitting device may be used.

Figure 2:
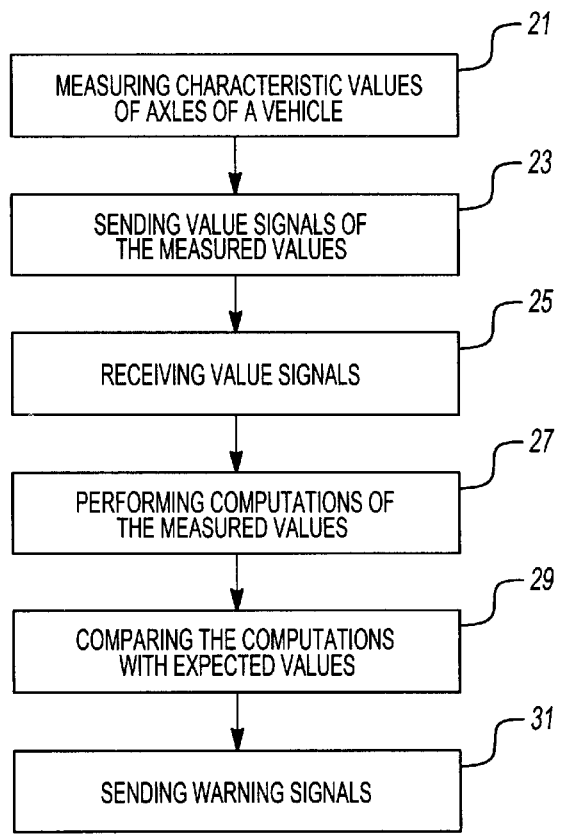
FIG. 2 is a basic flow chart of the present invention.

As shown in FIG. 2, a flow chart for this method that may be implemented by system 20 of FIG. 1 could be described as measuring characteristic values of axles of a vehicle in step 21, sending value signals of the measured values in step 23, receiving value signals, in step 25, performing computations of the measured values in step 27, comparing the computations with expected values in step 29, and sending warning signals when a problem may be present in step 31. The expected values will vary each time the vehicle is loaded with cargo, and will vary at each axle. The expected values can be determined as simply as taking the initial values measured by detectors 24 at the time the vehicle is loaded. The comparison would then look at subsequent measured values and see if they vary by more than a predetermined amount from the initial values.

It is to be noted that the invention is neither concerned with how characteristic values are measured nor by what medium signals are carried or retrieved; rather, it is concerned with measuring characteristic values of axles and sending value signals that may (1) be received or retrieved, (2) be compared with expected values, and (3) indicate to the driver that a problem may exist regarding the weight distribution of the vehicle.

Figure 3:
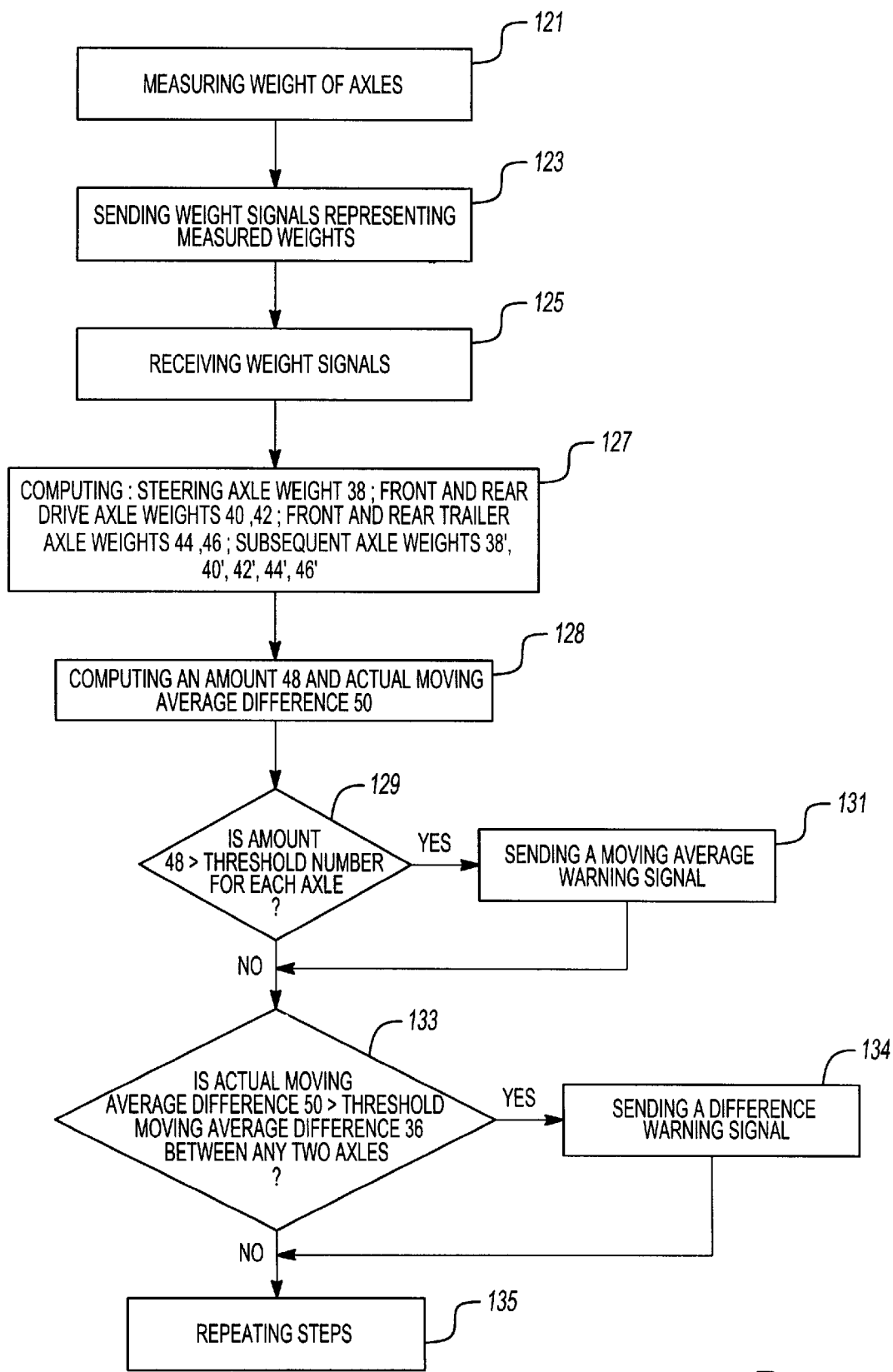
FIG. 3 is a flow chart of a method of an embodiment of the invention.

FIG. 3 shows a flow chart of an embodiment that further describes the basic flow chart shown in FIG. 2 and may be implemented by the system 20 of FIG. 1. As shown, the detectors 24 may measure the weight of axles during operation of the vehicle in step 121. The detectors 24 may then send to the control 26 weight signals 30 that represent the measured weight of the axles in step 123. As mentioned above, the detectors 24 may be any suitable devices known in the art that can measure weight and send signals that represent the measured weights of the axles. As mentioned above, although weight is disclosed, other variables (e.g. stress, strain, etc.) can be used. The method looks for changes in the measured values.

In this embodiment, the control 26 contains pre-stored expected values of the respective axles upon which weight is measured. The expected values include values which represent the expected weights of and differences between each axle. Specifically, the expected values may include a threshold number 34 and threshold moving average difference 36. The threshold number 34 represents a maximum or minimum allowable value for each. The threshold moving average difference 36 is the maximum allowable moving average difference between one axle and another axle.

As it is known in the art, a moving average is the average of a quantity of measured units, where a fixed number of previous measured units are replaced in time with more recent measured units. The measured weights are taken periodically. Thus, the moving average weight of an axle is defined in the preferred embodiment as the average of measured weights of an axle, where a fixed number of previous measured weights are replaced in time with more recent measured weights. The moving average weight of each axle is computed based on a predetermined time creating a "window" which captures the average weight of an axle during the predetermined time.

As it can be seen in FIGS. 1 and 3, the control 26 may generally receive the weight signals 30 from the detectors 24, perform computations based on the measured weights, and compare the computations with the expected values. Although there may be numerous ways in determining the weight distribution on a vehicle based on the weight on the axles of the vehicle, in this embodiment, the control 26 receives the signals 30 in step 125 and computes moving average weights of each axle in step 127, i.e., a steering axle weight 38, a front drive axle weight 40, a rear drive axle weight 42, a front trailer axle weight 44, and a rear trailer axle weight 46. Moreover, because the detectors 24 are measuring the weights of the axles and sending signals 30 to the control 26, subsequent moving average axle weights are also computed including a subsequent steering axle weight 38', a subsequent front drive axle weight 40', a subsequent rear drive axle weight 42', a subsequent front trailer axle 44', and a subsequent rear trailer axle 46'.

Additionally, in this embodiment, the control 26 computes an amount 48 and an actual moving average difference 50 in step 128. The amount 48 represents dividing the moving average weight of an axle by a subsequent moving average weight of the same axle of a vehicle. The moving average difference 50 is the moving average difference in weight between two different axles of a vehicle.

The control then compares the amount 48 of an axle with the threshold number 34 of the axle in step 129. If the amount 38 is greater than the threshold number 34, then a moving average warning signal 32A is sent to the display indicating that the weight distribution on a vehicle may have experienced a shift in step 131.

Additionally, the comparison of the amount 48 with the threshold number 34 may be used to measure and display the total weight of a vehicle as it is described in patent application Ser. No. 09/115,924.

Next, the control 26 compares the actual moving average difference 50 with the threshold moving average difference 36 in step 133. If the actual moving average difference 50 is greater than the threshold moving average difference 36, then a difference warning signal 32B is sent to the display indicating that the weight distribution on a vehicle may have experienced a shift in step 134.

It is to be noted that the invention is neither concerned with the type of warning signal nor the medium in which the signals travel; rather, the invention is concerned with sending a signal to any suitable display such that the display may indicate a problem with the respective weight distribution on the vehicle.

Additionally, the comparison of the actual moving average difference 50 with the threshold moving average difference 36 may be implemented to display a possible rollover detection and to activate the brakes as it is described in patent application Ser. No. 09/160,079.

Then, control 26 repeats the previous steps of receiving the signals 30 from the detectors 24, performing computations, comparing the computations with the expected values, and sending signals when necessary in step 135.

Again, the expected values are preferably simply read. Of course, there may be small acceptable variations from the expected values. Thus, the determination of a "problem" may require the measured weight to differ from the expected value by more than a predetermined amount. This could be set as a percentage of the expected values.

The computations and the steps discussed in this or any embodiment are not set out to limit the scope of the invention; rather, the computations and steps are simply provided to demonstrate a way to determine the weight distribution and shift across the vehicle. Thus, other additional or substitute computations and steps, as described below, are within the inventive scope.

Figure 4:
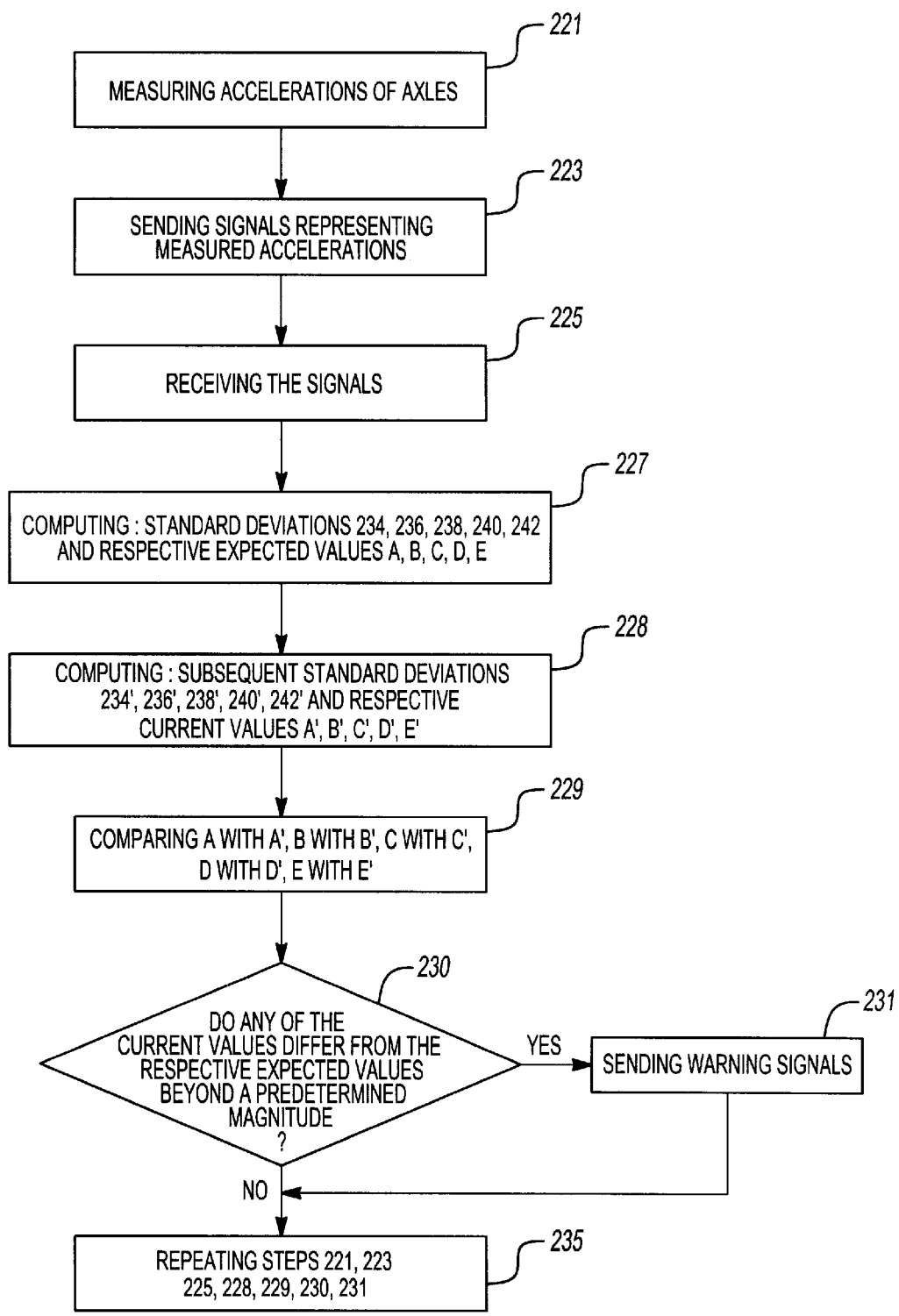
FIG. 4 is a flow chart of a method of another embodiment of the invention.

FIG. 4 shows a flow chart of another embodiment that further describes the basic flow chart shown in FIG. 2 and may be implemented by the system 20 of FIG. 1. Shortly after loading cargo onto the vehicle 22 and traveling a predetermined distance, the detectors may measure vertical accelerations of pre-selected axles during operation of the vehicle in step 221. For example, the detectors 24 may measure the vertical accelerations of axles such as the steering axle, front and rear drive axles, and front and rear axles. The detectors 24 may then send to the control 26 signals 30 that represent the measured accelerations of the axles in step 223.

The control 26 then receives the signals 30 from the detectors 24 in step 225. From the signals 30, the control 26 computes standard deviations 134,136,138,140,142 from the vertical accelerations of the axles in step 227. Additionally, the control 26 calculates expected values that may be used as reference values for the current cargo by simply dividing each standard deviation by another. For example, results of dividends 134/134, 136/134, 138/134, 140/134, 142/134 would respectively provide reference values A, B, C, D, E which signify the current weight distribution across the vehicle. Thus, the reference values would be representative of weight shift across the vehicle when compared with subsequent measured values.

As the detectors 24 continue to measure vertical accelerations of the axles, the control 26 receives subsequent measured values and computes standard deviations 134', 136', 138', 140', 142' in step 228. Additionally, the control 26 then divides each standard deviation with another, as mentioned above, to respectively attain current values A', B', C', D', E'. The control 26 compares A with A', B with B', C with C', D with D' and E with E' in order to determine whether weight shift has occurred across the vehicle in step 229. If the current values respectively differ from the reference values beyond a predetermined amount, then warning signals 32 may be sent to the display 28 indicating a potential problem in step 231. Likewise, further subsequent comparisons are performed in the same fashion with the reference values A, B, C, D, E.

Another embodiment may include measuring the deceleration values of each wheel during operation of the vehicle when neither brakes nor throttle is applied. Under such conditions, each wheel will decelerate independently of the other wheels, but will decelerate as a function to the weight on the wheel. As in the embodiment described in FIG. 4, reference values may be calculated and compared to subsequent measured values in order to determine weight shift across the vehicle. Again, a change in the measured values is indicative of a weight shift. Likewise, warning signals may also be sent when necessary. Moreover, in the time domain a time threshold may be used to require that a pre-specified number of events occur before sending warning signals. In addition, neural networks or fuzzy logic, as it is known in the art, may also be used to implement the present invention.

With there being numerous ways in implementing this invention, it again is to be noted that this invention is not limited to any step of computing or comparing; rather, it uses the steps described above to demonstrate the utility of this new invention and how it may be implemented to monitor the weight distribution on a vehicle.

What is claimed is:

1. A method of monitoring weight distribution of axles on a vehicle comprising:
   a. measuring a characteristic value of said axles of said vehicle;
   b. comparing said measured value with an expected value; and
   c. sending a signal indicating that said axles may be experiencing a problem relating to a potential shift in the weight distribution on said vehicle, based upon the comparison in step (b).

2. A method as in claim 1, wherein said characteristic value is a value of said axles indicative of weight on said vehicle.

3. A method as in claim 1, wherein said measured value is a plurality of measurements spaced over time on each axle of said vehicle.

4. A method as in claim 1, wherein said expected value is determined when the vehicle is initially loaded.

5. A method as in claim 1, wherein said signal is sent when said measured value differs from said expected value.

6. A method as in claim 1, wherein said characteristic value is a weight value.

7. A method of monitoring weight distribution on a vehicle comprising:
   a. providing a detector, a control, and a display;
   b. measuring a characteristic value of axles of the vehicle with said detector;
   c. sending value signals of said measured value to said control;
   d. receiving said value signals with said control;
   e. performing computations of said value signals;
   f. comparing the computations with an expected value of said axles; and
   g. sending warning signals to said display that there may be a problem relating to shift in weight distribution, when said measured weight differs from said expected value of said axles.

8. A method as in claim 7, wherein said measured value includes a plurality of characteristic values of said axles.

9. A method as in claim 7, wherein said characteristic value is a weight value.

10. A method as in claim 7, wherein said characteristic value is an acceleration value.

11. A method as in claim 7, wherein said characteristic value is a deceleration value.

12. A method as in claim 7, wherein said characteristic value is a stress value.

13. A method as in claim 7, wherein said characteristic value is a strain value.

14. A method as in claim 7, wherein said expected value is determined when the vehicle is initially loaded.

15. A vehicle weight distribution diagnostic system comprising:
   a. at least one detector connected to an axle of a vehicle for measuring a value indicative of weight on said axle;
   b. a control in communication with said at least one detector for comparing said measured value with an expected value of said axle; and
   c. a display in communication with said control for indicating that there may be a problem with weight distribution on said vehicle.

16. A method as set forth in claim 1, wherein the vehicle is loaded with a plurality of cargo items arranged in a certain fashion prior to steps A–C.

17. A method as set forth in claim 16, wherein the potential shift in the weight distribution will occur as the cargo items move in their arrangement within the vehicle.

18. A method as set forth in claim 7, wherein the vehicle is loaded with a plurality of cargo items arranged in a certain fashion prior to steps B–G.

19. A method as set forth in claim 18, wherein the potential shift in weight distribution will occur as the cargo items move in their arrangement within the vehicle.

20. A vehicle weight distribution diagnostic system as set forth in claim 15, wherein the vehicle is loaded with a plurality of cargo items arranged in a certain fashion, and the weight distribution problem relates to a shift in that arrangement.

* * * * *